No. 853,659. PATENTED MAY 14, 1907.
F. TYSON.
PASTEURIZING APPARATUS.
APPLICATION FILED JUNE 16, 1906.
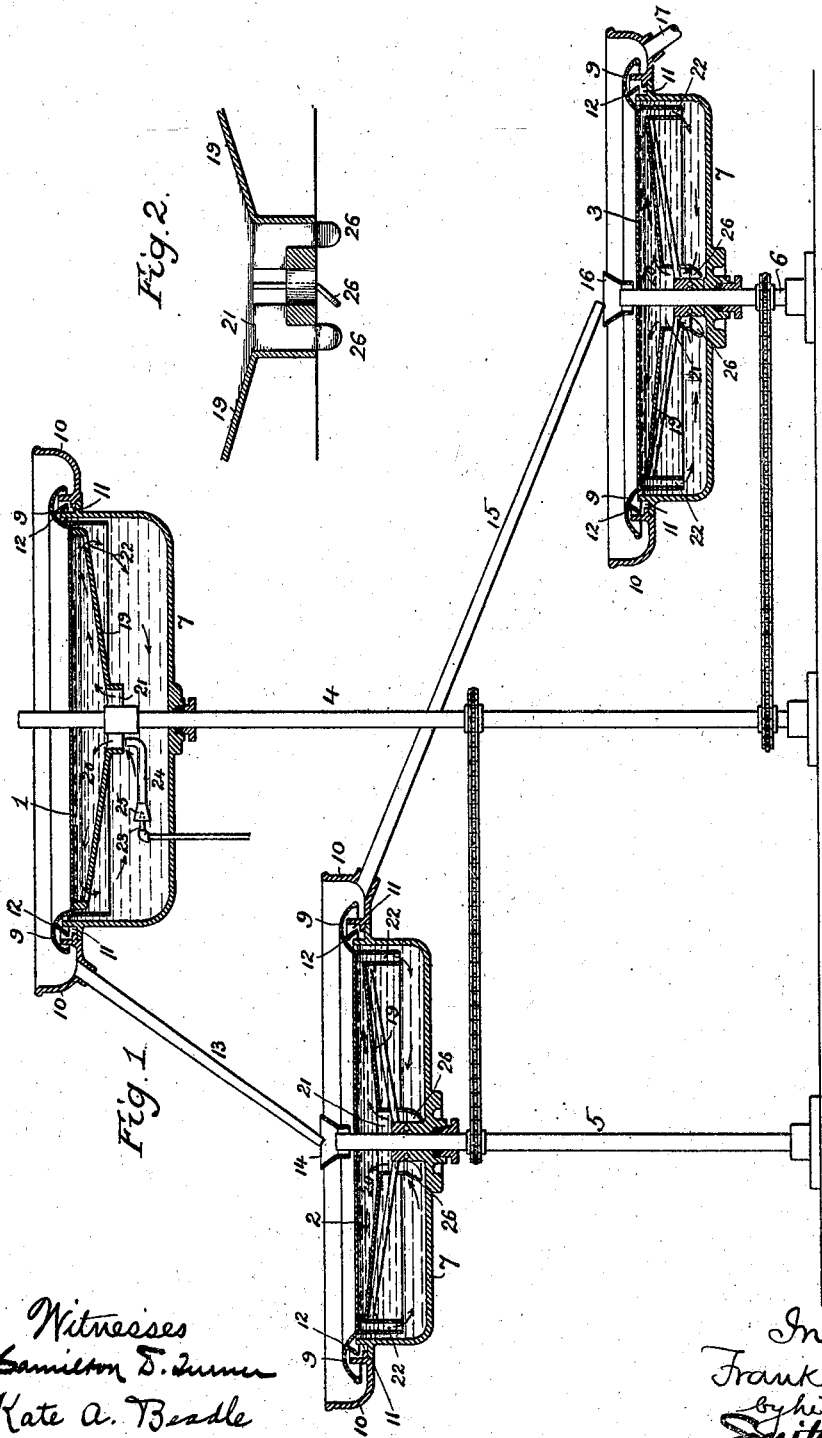

UNITED STATES PATENT OFFICE.

FRANK TYSON, OF CANTON, OHIO.

PASTEURIZING APPARATUS.

No. 853,659.  Specification of Letters Patent.  Patented May 14, 1907.

Application filed June 16, 1906. Serial No. 322,010.

*To all whom it may concern:*

Be it known that I, FRANK TYSON, a citizen of the United States, and a resident of Canton, Ohio, have invented certain Improvements in Pasteurizing Apparatus, of which the following is a specification.

My invention consists of certain improvements in the pasteurizing apparatus forming the subject of my Letters Patent No. 804,687, dated November 14, 1905, the object of my present invention being to provide for the quick and effective cooling of the liquid after the heating of the same, and to facilitate the circulation of the water or other liquid used for effecting the heating or cooling of the rotating plates over which the liquid to be pasteurized is caused to flow by centrifugal action. These objects I attain in the manner hereinafter set forth, reference being had to the accompanying drawing, in which Figure 1 represents, in vertical section, pasteurizing apparatus constructed in accordance with my present invention, and Fig. 2 is an enlarged vertical section of part of the same.

In the apparatus forming the subject of my previous patent, before referred to, the liquid to be pasteurized was fed onto the central portion of a rotating horizontal plate, and was caused to flow over the surface of said plate by centrifugal action, being finally discharged from the periphery of the plate into a suitable receiving trough, the liquid, during such flow, being subjected to heat, or being cooled, by causing a flow of hot or cold water in contact with the opposite side of the plate.

In carrying out my present invention, I employ, in connection with the heating device, a plurality of cooling devices and I provide each of the devices with means for facilitating the circulation of the liquid employed for heating or cooling the rotating treating plate, this aid to circulation, in the case of the heating device, also serving to maintain the heat of the liquid employed.

In the drawing, 1, 2 and 3 represent three horizontally mounted and rotating treating plates carried, respectively, by the vertical shafts 4, 5, and 6, which shafts are suitably mounted and are connected by chain gearing, or equivalent mechanism, so as to rotate in unison.

Each treating plate operates in connection with a vessel 7, for containing water or other heating or cooling fluid, the plate serving as a cap or cover for said vessel, and being provided with a curved peripheral flange 9, over which the liquid under treatment is discharged from the treating plate into an annular trough 10 of the water vessel, each vessel also having, between its water chamber and said trough, a supplementary trough or groove 11, into which projects a flange 12 on the under side of the flange 9, whereby any water escaping over the rim of the vessel will be directed into said supplementary trough, and thereby prevented from gaining access to the trough 10 and mixing with the liquid under treatment. The three treating plates and the vessels co-operating therewith are located in different horizontal planes, the uppermost plate constituting the heating device, and the intermediate and lowermost plates serving as cooling devices.

From the trough 10 of the uppermost vessel 7 a spout 13 delivers the contents of said trough to a feeding funnel 14 of the intermediate cooling device, and from the trough 10 of the latter a spout 15 delivers the contents to a feeding funnel 16 of the final cooling device, a spout 17 delivering from the trough 10 of the latter device into any suitable storing or transporting vessel.

Each of the plates 1, 2, and 3 has a backing plate 19, forming, with the top plate, a chamber 20 for the reception and circulation of the heating or cooling liquid, this chamber being in communication, through a central hollow hub 21, with the liquid at and near the central portion of the vessel 7, and being also in communication, through openings or channels 22 in the back plate, with the liquid at and near the outer portion of said vessel 7, whereby the rotation of either treating plate will, by the operation of centrifugal force, tend to cause circulation of the water or other fluid through the chamber 20, as indicated by the arrows. In some cases, however, it is advisable to assist the centrifugal force in inducing and maintaining such circulation, and the provision of such aid to circulation constitutes one of the features of my invention.

In the uppermost or heating device of the series this aid is furnished by an injector operated by steam, hot water, air or other fluid, preferably steam, which, in addition to its primary purpose, also has the effect of maintaining the heat of the flowing liquid by admixture therewith of the steam, hot water, or other fluid, whereby the injector is operated. Such injector consists, in the present instance, of a supply nozzle 23, and a combining tube 24, with funnel end 25 into which the jet is projected, said jet inducing a flow of water from the vessel 7 into the combining tube, and the mixture of the water and inducing fluid being delivered vertically from the upturned end of said combining tube into the hollow hub of the backing plate 19 of the treating plate 1, and again serving as a jet to induce the flow of water from the vessel 7 into the chamber 20.

In order to assist circulation of the water in the chambers 20 of the cooling plates 2 and 3 the open hub of the backing plate 19 of each of said cooling plates is provided at the bottom with inclined blades or vanes 26, whose tendency, when the plate is rotated, is to cause an upward flow of water through the hollow hub from the vessel 7 into the chamber 20. In either case, the water thus caused to enter the chamber 20 at the center, finds its way back to the vessel 7 through the openings or channels 22 adjacent to the periphery of the plates. By the use of a plurality of cooling devices I am enabled to employ, in the second of said devices, a cooling fluid having a temperature lower than that employed in the primary cooling device, thus effecting a gradual cooling of the liquid under treatment, and permitting of the rapid flow of said liquid over each of the cooling plates.

I claim:—

1. The combination, in pasteurizing apparatus, of a rotating heating or cooling plate, a vessel containing water or other liquid, means whereby flow of said water in contact with the heating or cooling plate is caused by centrifugal force, and means for aiding such centrifugal force in causing such flow.

2. The combination, in pasteurizing apparatus, of a rotating heating plate, a vessel containing water or other heating liquid, means for causing flow of such liquid in contact with the treating plate by centrifugal force, and a fluid-actuated injector for aiding such flow.

3. The combination, in pasteurizing apparatus, of a rotating heating plate, a vessel containing water or other heating liquid, means for causing flow of such liquid in contact with the treating plate by centrifugal force, and a steam-actuated injector for aiding such flow.

4. Pasteurizing apparatus in which are combined a rotating plate having a backing plate with hollow hub, said plates inclosing a circulating chamber having discharge outlet near the periphery of the plates, a liquid-containing vessel operating in conjunction with such plate, and means other than centrifugal force for causing the liquid to pass from said vessel into the circulating chamber through the hollow hub.

In testimony whereof, I have signed my name to this specification, in the presence of two subscribing witnesses.

FRANK TYSON.

Witnesses:
C. M. CLENDENING,
WM. SIMPSON.